United States Patent [19]

Gebel

[11] Patent Number: 5,075,772
[45] Date of Patent: Dec. 24, 1991

[54] METHOD AND AN APPARATUS FOR THE SURVEYING OF ROAD PROPERTIES AS TO THE LENGTH OF THE AXIS, THE WIDTH AND THE HEIGHT OR THE ASCENT

[75] Inventor: Hans-Peter Gebel, Frankfurt, Fed. Rep. of Germany

[73] Assignee: Ingenieurburo Dr. Ing. H.-P. Gebel, Frankfurt, Fed. Rep. of Germany

[21] Appl. No.: 512,814

[22] Filed: Apr. 23, 1990

[30] Foreign Application Priority Data

Apr. 27, 1989 [DE] Fed. Rep. of Germany ....... 3913988

[51] Int. Cl.⁵ .......................... H04N 7/18; H04N 5/84
[52] U.S. Cl. ....................................... 358/107; 358/93
[58] Field of Search ................. 358/107, 108, 93, 103, 358/110, 112, 113; 340/988, 995, 928

[56] References Cited

U.S. PATENT DOCUMENTS

| | | | |
|---|---|---|---|
| 3,882,268 | 5/1975 | Ogawa et al. | 358/108 X |
| 4,247,870 | 1/1981 | Gabel et al. | 358/93 |
| 4,278,142 | 7/1981 | Kono | 358/103 X |
| 4,396,942 | 8/1983 | Gates | 358/335 X |
| 4,555,725 | 11/1985 | Geiersbach et al. | 358/108 X |
| 4,700,223 | 10/1987 | Shoutaro et al. | 358/97 X |
| 4,700,331 | 10/1987 | Scott | 340/995 X |
| 4,899,296 | 2/1990 | Khattak | 364/550 |

Primary Examiner—Kenneth A. Wieder
Assistant Examiner—Glenn W. Brown
Attorney, Agent, or Firm—Helfgott & Karas

[57] ABSTRACT

A method and apparatus for the surveying of road length, road width and height, and ascent and incline of the road, wherein approximately equally spaced measuring marks are applied onto the road surface along the axis of the road, which measuring marks are then approached by a surveyor vehicle and the actual straight line distance between the measuring marks is exactly measured by a gauging system provided on the surveyor vehicle. The measuring marks are scanned by video cameras measurably adjustable on X, Y tables or are scanned by electromagnetic sensors while the position of the video cameras or sensors on the serveyor which can exactly be measured. For height measurements, a vertical reference line is defined by means of perpendicular bars and laser devices and the distance thereof relative to the road surface is measured at locations, the positions of which can exactly be defined by the video cameras. The measured data are stored digitally and/or as monitor images, on magnetic tapes.

22 Claims, 4 Drawing Sheets

METHOD AND AN APPARATUS FOR THE SURVEYING OF ROAD PROPERTIES AS TO THE LENGTH OF THE AXIS, THE WIDTH AND THE HEIGHT OR THE ASCENT

BACKGROUND OF THE INVENTION

The invention relates to a method for the surveying of roads as to the length of the axis, the width and the height or ascent, by which road surveying can substantially be performed in an automated way by less trained assistant personnel. An apparatus by which the surveyings can be performed is described as well.

Surveyings of roads have to be performed with increasing exactness, i.e. that the amount of the data obtained is constantly increasing as well; on the other side, personnel costs are more and more increasing so that the surveying of roads has to be automated as much as possible. In addition, the data should be so obtained that they can directly be processed in a data processing device and be stored away in a storage unit.

While old and proven geodetic methods will yield very exact data, such geodetic measuring methods are too slow and too expensive because they are too work-intensive and require highly qualified personnel. Modern possibilities include surveyings via satellite by terrestrial satellite navigation which, however, with a view to the highly sophisticated structure, are too expensive for the time being, if only simple data files have to be established for retrieval in an undetermined future.

From German Patent Specification No. 2,604,711, a road meter has been known wherein the distance to be measured, normally the axis of the road, is passed by a travelling wheel and the circumferential length of the wheel is assessed as the measured value of the length and is stored in a digitalized form. In spite of the provision of corrections, mainly correcting the pneumatic pressure of the travelling wheel, the exactness when so measuring is too small. Properties of the road surface, furthermore, such as wetness, dirt, road holes etc., enter too strongly into the measuring results, particularly if the individual measured data are summed up to the desired total measuring value (for instance of the length of the axis of the road between two junctions). By means of such a travelling wheel, furthermore, only the one parameter of length can be measured. With a view to the meanwhile considerably increased possibilities of data storage, it is however desired to cover the course of the road, if possible, three-dimensionally and store it away, that is one has to determine the length, the width and the height or the ascents and inclines corresponding to the relative heights.

SUMMARY OF THE INVENTION

It is an object of the present invention to provide a method by which roads can be measured substantially automatically, rapidly and independently from the surface conditions of the roadway, as to the length of the axis, the width and the height and slope in all spatial directions and to provide an apparatus by which such surveyings can be performed.

It is essential for the execution of the present invention in practice that measuring marks are applied by a marker device along the axis of the road or approximately equally spaced relative to the road axis. Such measuring marks may include visible color spots or spots detected by infrared or ultra violet radiation. The video cameras employed, in the optical range thereof, which if necessary is corrected by filters, should therefore be tuned to the measuring marks.

A further possibility for automating the measured method is obtained by employing, as the measuring marks, metal spots which are applied on the road either by using metal powder containing suspensions (such as iron bronze) or are sprayed on, for instance by means of a high-frequency welding device, as "welding spots". Such metal spots can by an automated measuring method be scanned electromagnetically by so positioning induction loops until the metal spots are in the middle thereof.

The measuring marks are applied in approximately equal distances, preferably in the variation range of the length gauge. When using a small bus, a variation range for the length gauge in the order of magnitude of 5 meters is advisable. As the marker device, a measuring or travelling wheel having pneumatic tires as has been known from German Patent Specification No. 2,604,711 referred to in the beginning can be used in combination with a pulse-controlled color spray gun. The inaccuracies of these prior art travelling wheels need not be corrected in the marker device employed according to the present invention, since they are picked up during the concrete measuring process of the length measurement and, data-wise, are processed. If the surveyor vehicle exactly measures the distances of the measuring marks, applied with a certain inaccuracy, only the exact measurement values are fed into the data processing and storage device. In order to obtain a length, for instance between two junctions, only the exact measurement values are summed up.

If on the other hand, height and ascent measurements in the length direction of the road, or in the cross direction, have to be performed, the measuring marks serve as a station for the measurement to be performed, whereby the exact position of this station has been known from the exact length measurement. If necessary, height and width values of a road can be found at any location by interpolation on a computer.

The marker device for applying the measuring marks, or for "providing stations" can be arranged on the surveyor vehicle, it may however also be secured to a different surveyor vehicle, which for instance applies the measuring marks, independently from the surveying operation, hours or days in advance.

For scanning the measuring marks applied, devices have to be employed, which are tuned each to the kind of measuring mark. In other words, visible color spots or spots recognizable by infrared or ultra violet radiation are scanned by optical devices, preferably video cameras the optical range of which is tuned to the measuring mark. In some cases it might be necessary to irradiate the visible range of the optical device, or of the video camera, respectively, with the radiation tuned to the measuring mark. Operation in a selectively adapted radiation permits performing the surveying operation during the night hours when traffic is reduced on one hand, and disturbing scattered radiations are eliminated by working in selective radiation ranges, on the other. If the measuring marks are metal spots, they are preferably scanned by inductively sensitive sensors. To this end, Hall sensors may for instance be used, which on measuring arms are moved over the road surface. The location showing maximum response signals localizes the measuring mark.

In the apparatus according to the invention, commercial video cameras can be employed provided they are optically adapted to the color of the measuring mark. Interposition of filters may increase the contrast between the measuring mark and the road surface.

It is also useful to provide in the video camera a marking raster, cross hairs, marking circle or the like in order to make possible an exact positioning when positioning the video camera above a measuring mark. For simplicity sake, reference is made in the following only to "cross hairs" as the marking in the video camera although other positioning aids will serve the same purpose.

The image taken by the video camera from the road surface is transmitted to a monitor which is highly visible by the operator who performs the measurement. He drives the surveyor vehicle in such a way that the cross hairs in the monitor coincide with the measuring mark.

In order to avoid tiresome maneuvering of the surveyor vehicle, the video camera the cross hairs of which are to be made coincident with a measuring mark, is suitably mounted on a cross table, or xy table, the operation of which is remote-controlled by the operator who tracks the image from the video camera on the monitor. An inductive scanning device for metallic measuring marks is also shiftably mounted on a cross table. In that case, shifting may be performed automatically whereby the measuring mark is passed in the x or the y direction, respectively, until the measuring signal has reached its maximum value at the respective measuring mark.

In the present specification, x denotes the longitudinal direction, y the cross direction and z the upward direction of the surveyor vehicle.

The gauging system for exactly measuring the distance between two measuring marks or for measuring the width of a road comprises a length gauge which in the x direction of the vehicle is connected with it, and a width gauge which is connected with the surveyor vehicle in the y direction. The length of the length gauge, or the width of the width gauge, respectively can exactly be measured by any process known per se. The length gauge comprises a base distance for which in practice a length of about 5 meters has shown to be useful, and the additional partial distances additively or subtractively to be added which are obtained, on the xy table, or the xy tables, respectively, after positioning of one or two video camera(s) or of electromagnetic sensors at endpoints of the length gauge.

The length gauge can for instance be modified by a mechanical adjustment device comprising a telescope bar the extraction length of which can exactly be measured. The telescope bar may suitably be extracted and retracted by means of a stepping motor whereby the extraction length is given digitally as the step number of the motor. For the adjustment of the length gauge a mechanical cable line may furtheron be used the length of which can be measured via a cable line potentiometer. Worm gears, mechanical adjustment devices including spiral potentiometers and similar adjustment means, the change of the length of which can exactly be measured, may be used as well.

The length gauge is either provided at the bottom of the car frame or on the roof of the surveyor vehicle or constitutes an imaginary length which is for instance measured by ultrasound or laser. In any case the length of the length gauge can exactly be measured with high accuracy by prior art means. The concrete or assumed ("imaginary") length gauge can suitably laterally be extended so that the measuring marks may be passed uninhibited for instance by road boundaries, lane dividers and the like.

The width gauge for measuring the width of a road in the y direction preferably comprises an extensible base gauge which like a telescope can so be drawn in that it can completely be accomodated in the surveyor vehicle with the doors closed. For a measurement it is extended to the respective known length while a video camera, or an inductive sensor for metallic measuring marks, respectively, at one endpoint, preferably secured on an xy table is positioned above each measuring mark. The other endpoint is as far extended as the width measurement requires. By means of a video camera on the other endpoint, the road edge becomes visible. The width is obtained from the width, or the extension length of the base gauge, respectively, and the additively or subtractively measured shifts on the xy tables.

The width gauge, as for the rest, may be an assumed, or imaginary, dimension which is exactly determined for instance by ultrasound or laser.

Roads having several lanes are suitably measured in several steps as to the width thereof since too long extension lengths are not advantageous in practice (difficult adjustment because of vibrations, safety problems, etc).

The width gauge can further be used for determining the inclination of a road at the location of a measuring mark. To this end, the one end point of the width gauge on which, mounted over an xy table, a video camera is provided, is positioned above a measuring mark by bringing into coincidence the cross hairs of a video camera with the measuring mark image. In case of metallic measuring marks, positioning of the inductive sensor above a measuring mark is analogously accomplished. The width gauge is drawn out to a predetermined length, for instance 3.5 meters, whereupon the height of the road is measured at the two end points of the width gauge in a way as will be described later, or by measuring the inclination of the road directly via the inclination of the surveyor vehicle (as will also later be described in connection with the measurement of the ascent in the direction of the axis). The measured heights are stored in the data processing and storage means. When subsequently travelling along the road in the opposite direction, the counter lane is measured in the same way. By calculation processes known per se, it can be determined how the road is inclined to the two sides at the location of the measuring mark.

The adjustment means for the defined alteration of the length of the length gauge, or the width of the width gauge, respectively, including the adjustment means for changing the xy position of a video camera or of an electromagnetic sensor operate in a manner known per se, viz. by a fine pitch screw, toothed racks or the like, whereby stepping motors are advantageously used for the movement, said stepping motors being provided with counter circuits by means of which angles of rotation are digitally determined as stepping quantity of the rotation performed. These angles of rotation, on the other hand, correspond to a defined length advance. The digital values are then directly fed as measuring signals to the data processing means.

A substantial aspect of the present invention is seen in the measurement of heights, descents and ascents of roads.

There are not many roads which are without any ascent or inclines so that the surveyor vehicle is generally "not in balance" during the measuring process. In the present invention for instance, a vertical system is used by means of which a vertical reference line can be adjusted. If the surveyor vehicle is aligned in the longitudinal direction of the road, the length gauge is substantially in parallel relative to the axis of the road at the measuring location as is necessary in order to determine a length of the axis of the road. At the endpoints of the length gauge, to be more precise, at the ends of the base distance, vertical bars each are provided which are pivoted advantageously via a knuckle joint for movements about the x axis (rolling), about the y axis (bending) and about the z axis (yawing) on an xy table on the roof of the surveyor vehicle. Vertical sensors examine and control the vertical status of the vertical bars and, if necessary re-adjust the positions of the vertical bars on the xy table on the roof if the base point of the vertical bar is changed. At the lower end of a vertical bar, a video camera is provided which is mounted on an xy table solidly secured to the surveyor vehicle and is connected to the vertical bar. The position thereof on the xy table is so changed in the x and in the y direction as the measurement requires. If by so doing, the vertical bar is no longer vertical, this is sensed by the vertical sensor and the suspension position of the vertical bar, on top, is re-adjusted. At least one of the video cameras at the ends of the length gauge is positioned, with the cross hairs thereof, above a measuring mark. Thereby, the vertical base point of at least this one pertinent vertical bar is forcedly changed so that the pertinent vertical sensor has to accomplish a re-adjustment on the xy table.

On one vertical bar of one measuring gauge (length or width gauge), a laser source is provided while at the other vertical bar at the other end of the gauge, a laser beam sensor is provided, either the laser source or the beam sensor, or both, being provided for up and down motion on the respective vertical bar. Since the two vertical bars are in parallel, the laser beam when radiated at right angles relative to the vertical bar, produces when hitting the beam sensor, a vertical reference line which can be employed for level determination.

The invention is not restricted to the employment of vertical bars including vertical sensors in connection with a laser for the determination of a vertical reference line. Other kinds of vertical sensors may be employed as well provided that they are suited to generate a vertical reference line on the base of the gravitation of the earth. The method of the invention has been described here as a static method; in other words, in order to measure the surveyor vehicle stops and performs the measurements while standing. In that case, the vertical bars each can be perpendicular. Since the method of the invention should permit a better automation of the measuring process, it is desirable that the successively performed measuring processes can be performed dynamically, i.e. while the surveyor vehicle is in motion. In that case, the inertia of the pendulous vertical system might lead to errors. A system which maintains the apparent perpendicular line of the earth with less inertia, is found in the use of a gyroscope system. New model gyroscopes, wherein the torque, also about the vertical axis of a plane, is corrected, so-called "rate gyros", permit dynamic measurement on a vehicle in motion. When performing such dynamic method, a static control measurement may from time to time be made.

Tightly below each video camera, a distance or, in this case, a height gauge is provided, by which the distance relative to the road surface can be measured. Since the distance between the laser and the height gauge can be measured by defined shifting of the laser beam source, or the beam sensor, respectively, the height of the laser beam reference line above the road surface can therefore be measured at both endpoints of the length gauge. The difference of the two measured heights yields the height difference between the two measuring points from which, with the distance between the vertical bars known the road incline can be calculated.

The ascent of a determined section of the road along the axis of the road is obtained by addition of the successively measured height differences, divided by the total length.

Analogous arrangements of vertical systems (vertical bar, vertical sensor) including a video camera to be moved on an xy table and a combination of laser source and beam sensor on the vertical bars at the endpoints of the width gauge permit the determination of the incline of a road at the location of a measuring mark. In such a case, the width gauge is extended to a predetermined length ("road width") and the incline of the road can be referred to the effective road width or the projection thereof.

A further advantageous measuring system for measuring the height of a horizontal reference line above the road surface at several points can be seen in the use of a hose levelling instrument the openings of which are provided each at the endpoints of the length gauge, or the width gauge, respectively. The connecting hose is advantageously disposed at a low-lying location, for instance under the bottom of the surveyor vehicle. An electromagnetically actuated stop cock closes the passage during the travel of the surveyor vehicle in order to reduce the dislocation of water (or any other suitable liquid) when travelling. For measurement, the stop cock is opened. For the height measurement, the height of the water level above the road surface is measured, for instance by means of ultrasound. As the reference height, the middle of the hose system solidly arranged relative to the surveyor vehicle, can be employed.

The height data are arithmetically processed, in a manner known per se, and either recorded or stored away.

In another embodiment of the invention, instead of a horizontal reference line, a right angle is provided on the surveyor vehicle as a reference system. To this end, for instance one leg of the right angle is provided along the frame of the surveyor vehicle from the rear to the front. On a straight road without any incline, the second leg of the right angle is adjusted in vertical direction at a right angle relative to this leg in that an adjustment arm attaching at the vertical leg and engaging in a worm gear is regulated until the first leg connected with the frame and the second leg form a right angle in a vertical plane. The worm gear may for instance be secured to the roof of the surveyor vehicle and via the surveyor vehicle and the frame is rigidly connected with the first leg. Vertical sensors known per se control the perpendicular position of the second leg.

If now the surveyor/vehicle is on an inclined road (assumedly inclined in axial direction), the first leg of the measuring angle is in parallel relative to the road axis and the second angle of the measuring angle has left the vertical line. The inclination thereof against the vertical line corresponds exactly to the angle of inclination of the road. If now the second leg of the measuring angle is returned, by vertical sensors, into the perpendicular position again, in that the adjustment arm connected with the worm gear is retracted into the worm or extracted from the worm, the dislocation of the worm gear corresponds directly to the angle of inclination which the second leg of the measuring angle used to have relative to the vertical line. The worm gear can therefore be calibrated in degrees of the angle of inclination of the road.

In that case, the degrees of the angle of inclination are directly measured as the data of each measuring mark and stored as data.

A lateral inclination of a road can analogously be determined at the location of a measuring mark. To this end, it should however be safeguarded that a reference line solidly connected with the frame of the surveyor vehicle can serve as the first leg of the measuring angle. That means that in case of a road inclination transversal to the road axis, the surveyor vehicle so follows this inclination that the first leg (i.e. the first reference line) is in parallel relative to the road surface. In that case, a second leg of the measuring angle can be returned into the vertical line by a worm gear while measuring the corrected angle of inclination.

An advantage of the measuring process according to the invention is also seen in that in the data storage means a large amount of data of measuring values can be stored which can be retrieved if an when required and can be assessed in accordance with various points of view. It is also possible to store the measuring results at the individual stations, i.e. at the individual measuring marks, as monitor recorder images on a commercial video tape. A plurality of images covered by the video cameras may in that case be combined on a single monitor image, as well. Allocation data such as junction data, time data, speed of the surveyor vehicle, name of the operator and so on as well as digital numerical values elaborated at the measuring stations in combination to the monitor image may additionally be stored at a different location of the image recording.

In accordance with the principle of the invention, roads can be surveyed in one single operational step by means of a surveyor vehicle completely equipped according to the invention firstly as to the length of the axis thereof, second as to the width thereof, third as to the height and ascent in the direction of the road axis thereof and fourth as to the height and incline thereof transversal relative to the direction of the road axis. In so-called static operation, safe approaching of the measuring marks in order to make only small correction necessary via the xy tables, and careful positioning of the scanning means for the measuring marks, i.e. of the inductive sensor or the cross hairs of the video camera on the measuring mark, which is not normally point-shaped but rather an elongated spot, is the only requirement asked from the operator. In so-called dynamic operation, which is possible when using electromagnetic sensors, positioning above the measuring marks may extensively be automated. Since the length and width values of the gauging system are preferably digitalized, they are directly fed into the data processing and storage means during the measuring process which is initiated by the operator by pressing a button or which is automatically released. The location of the measurement is obtained by counting the measuring marks approached. Only from time to time are control inputs of junction points necessary.

It has shown however to be useful to also enter a tachometric distance measurement for the control of the measuring stations into the data processing and storage means and to record it as well.

In the following, the surveying of roads by means of the apparatus according to the invention will be explained in more detail based on the methods disclosed. Reference is made in this connection to the attached drawings.

DETAILED DESCRIPTION OF THE PREFERRED EMBODIMENTS

Figure 1:
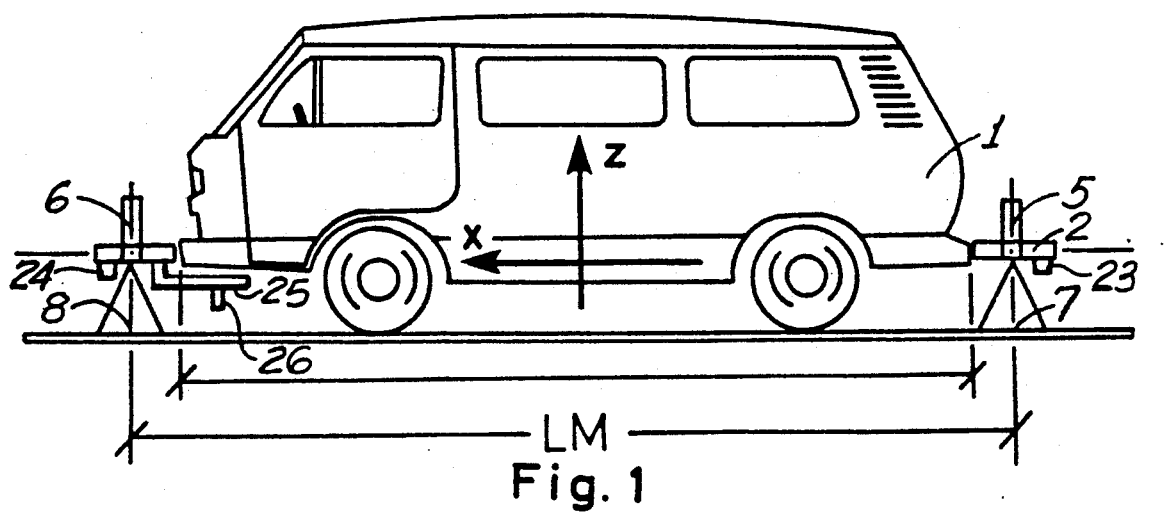
FIG. 1 is a lateral view of a surveyor vehicle by which a determination of the length of road axes can be performed.
Figure 2:
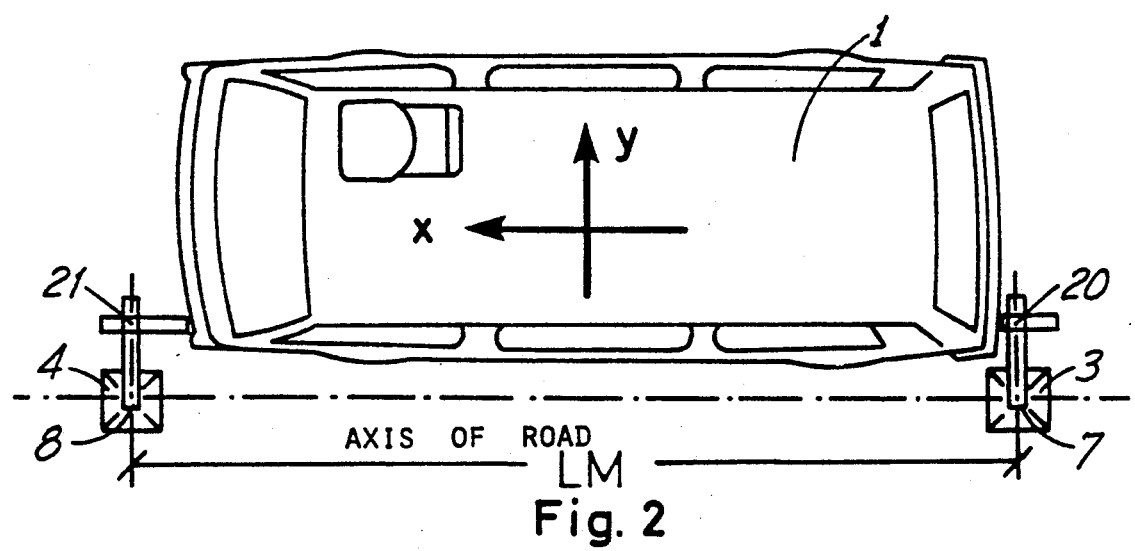
FIG. 2 is a top view of the vehicle shown in FIG. 1.
Figure 3:
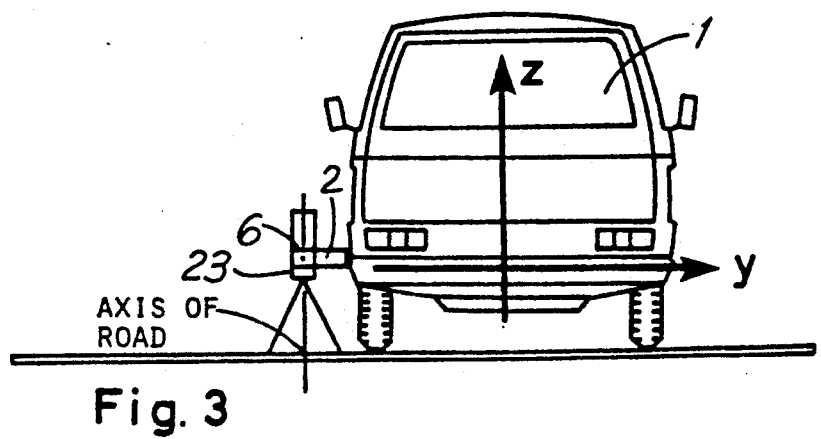
FIG. 3 is a rear view of the vehicle shown in FIG. 1.
Figure 4:
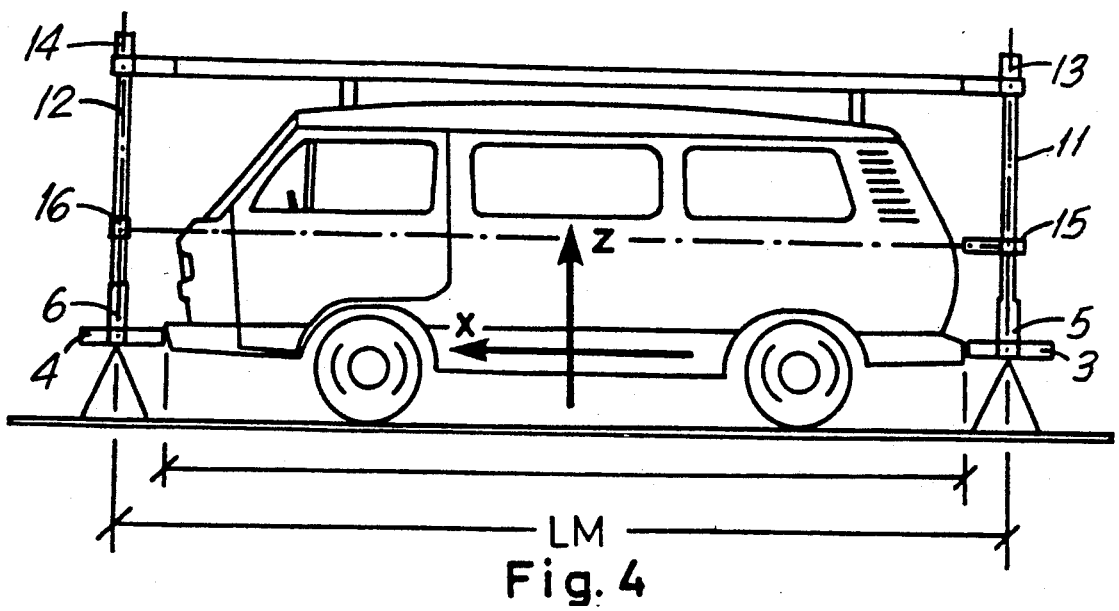
FIG. 4 is a lateral view of a surveyor vehicle including the apparatus according to the invention for the determination of the height of road axes.
Figure 5:
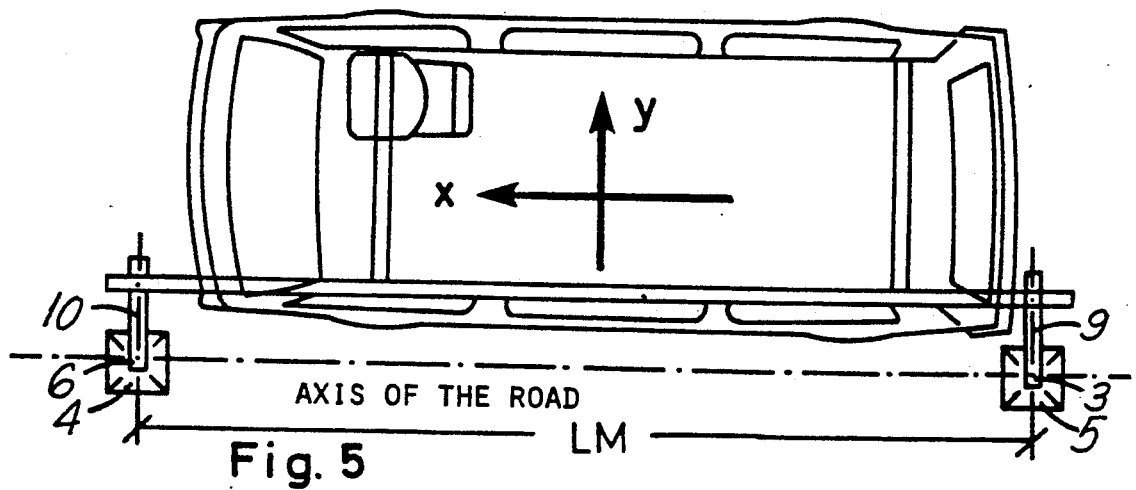
FIG. 5 is a top view of the surveyor vehicle shown in FIG. 4.
Figure 6:
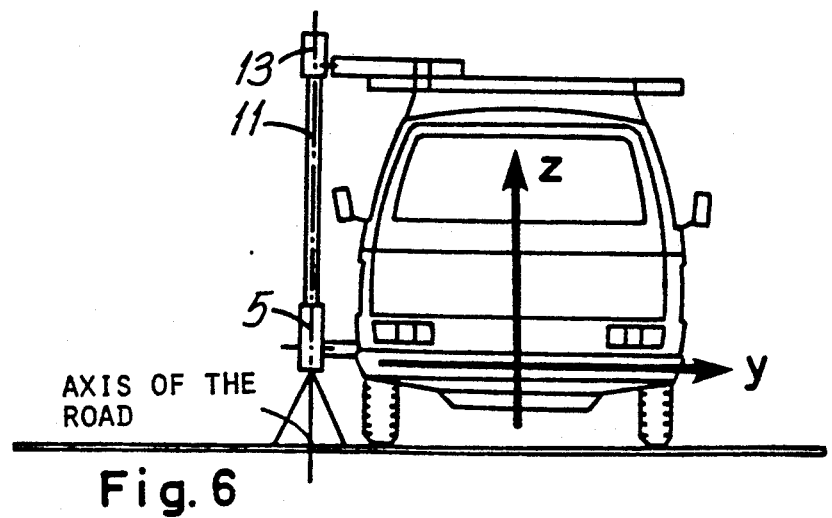
FIG. 6 is a rear view of the surveyor vehicle shown in FIG. 4.

A surveyor vehicle 1 includes a length gauge LM composed of a rigid base distance of a length of about 5 meters and an xy table 3 in the rear and an xy table 4 in the front. A video camera 5 is provided in the rear on the xy table, shiftable in the x and the y direction for positioning cross hairs above a measuring mark at location 7. In the same manner, a video camera 6 is shiftably provided on xy table 4 for positioning a measuring mark 8.

On surveyor vehicle 1, at the left front corner and the left rear corner each an arm 2 is provided which can be shifted above the xy table. The shifts in the x and the y direction can be measured. At the end of each arm, there are knuckle joints 20, 21 which permits movement about the x axis (rolling), about the y axis (bending) and about the z axis (yawing). At each knuckle joint, video camera 5 (rear) and 6 (front), respectively, are provided, the axes of which extend in the z direction.

Below the camera objective, a measuring device 23, 24 is provided shiftable in x direction for the measurement of the distance from the road surface.

A first possibility of operation is to apply, in a separate operational step, measuring marks onto the road surface in the shape of color spots which can be detected by visible, infrared or ultra violet radiation, or metal spots which can be scanned electromagnetically, and subsequently exactly measure the distance therebetween by means of the surveyor vehicle 1. While the principle of the invention is also applicable to a scanning of measuring marks in the form of metal spots by means of an electromagnetic sensor, such as an induction loop, the description of an exemplified embodiment will be given based on color spots which are scanned by video cameras. For scanning the measuring marks, a first surveyor vehicle applies measuring marks in about equidistant sections of a length of about 5 meters, for instance be means of a travelling wheel of known circumferential length including a length counter in combination with a pneumatically operated spray gun, whereby the counter emits the signals for the pulse-wise actuation of the spray gun. In a second operational step, the surveyor vehicle 1 approaches the measuring marks and measures the distances of the measuring marks earlier applied in that the operator positions the cross hairs of video camers 5 and 6 above the locations of measuring marks 7 and 8.

The sum of the established individual length between two measuring marks each constitutes the total length of the distance to be measured.

In this process, the measuring values found are stored in data storage means. Alternatively, however, the of the measuring mark images received by the front video camera 6 and the rear video camera 5 can electronically be combined into a single monitor image and the combined monitor image (instead of the measuring data) can be recorded in a recorder and later assessed. The advantage of this process is that the measuring process performed by the operator may later be reproduced again.

Another mode of operation for the determination of the length of the road axes by means of a surveyor vehicle 1 is possible as well. According to this mode of operation, the measuring marks are applied by the surveyor vehicle during the course of the measuring process.

To this end, a sleigh 25 is provided on the front measuring arm between the road and the video camera which sleigh is in parallel relative to the plane of the xy table and to which a marker device is mounted. The measuring process starts in that the marker device on the sleigh is moved into the axis of the video camera and applies a measuring mark onto the road by a spray gun or like 26.

The surveyor vehicle 1 then moves forward for a distance which corresponds to the distance of the cross hairs and by means of the rear video camera 5 traces the measuring mark applied before. After positioning, the marker device is moved again into the axis of the front video camera and applies the next mark.

In this way, the measuring marks are applied in exactly known distances each. Applying the marks and measuring the distance thereof is performed in the same operational step. The sought road length is obtained from the summation of the individual measuring mark distances.

FIGS. 4 through 8 depict the method according to the invention for the determination of the height of the road axes.

The new method can be considered as an automation of the geodetic height measurement hitherto common. The height differences of the road axis to be measured are automatically determined one after the other with plus or minus in small distances (about 5 meters). The sum of all the differences yields the relative height between the starting point and the endpoint of the total measurement.

In order to do this measurement, the surveyor vehicle 1 is provided with vertical means and a horizontal laser beam reference line. At the left front corner and the left rear corner of surveyor vehicle 1, one arm 9 and 10, each, is provided. Each arm may be shifted above an xy table 3 or 4 in x and in y direction and the shift can in each case be measured. At the end of each arm, a knuckle joint is provided to which a video camera 5 (rear) and 6 (front) including cross hairs is provided, the axis of which points into the z direction.

Below the camera objective, the measuring mean 23, 24 is provided shiftable in the x direction for measuring the distance of the xy table from the road surface. This measuring means can be an ultrasound distance sensor if measurement is to be contact-less. Alternatively, the length of the distance may also be measured directly in that for instance a test rod is lowered via a stepping motor and the steps required for lowering are counted, or in that a moving ball is used which is pivotally secured to one rigid arm so that the deflection angle which can for instance be measured via a potentiometer is measured as the measure for the height.

In order to keep the axes of the video cameras constantly perpendicular for the measurement, the joints of the arms are connected via a vertical bar 11 or 12, respectively, with xy tables on the vehicle roof. To the joint head on the vehicle roof, electronic vertical sensors 13 and 14, respectively, are attached, which control an independent control circuit which keeps the axes of the vertical bars perpendicular at the time of the measurement. If the base point of a vertical bar has forcedly to be changed because of a wrong movement of the video camera, the vertical sensor causes that the mounting support of the vertical bar up on the xy table is so re-adjusted that the vertical bar suspends again perpendicularly.

At the rear vertical bar 11, a laser source 15 is provided which emits a laser beam at right angles relative to the vertical bar in the direction towards the front vertical bar 12. A laser beam sensor 16, for the laser beam, provided on the front vertical bar 12 and movable in the longitudinal direction thereof adjusts itself automatically into the beam axis. In other words, it moves along in the longitudinal direction thereof until it receives the laser beam.

By the laser beam, a horizontal reference/line is created. The height of this reference line above the road surface results from the measured distance between the road surface and xy table and from the distance as can be calculated for the beam sensor from the control value between xy table and the reference line. The height of the reference line above the road surface can similarly be measured at the rear vertical bar 11. The absolute height difference between the front and the rear vertical bar base point results as the difference of the heights.

Figure 7:
FIG. 7 is a lateral view of the surveyor vehicle shown in FIG. 4 when surveying a road is of high ascent in the direction of the axis.
Figure 8:
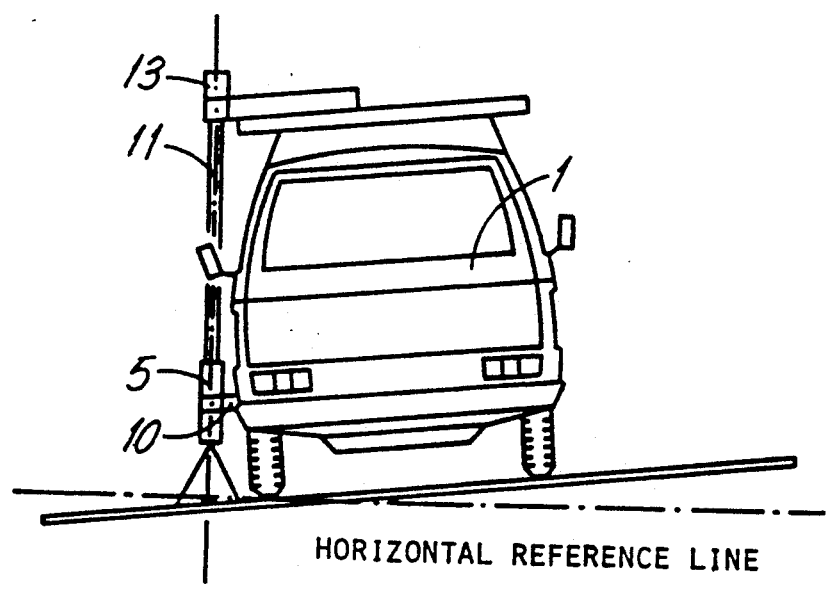
FIG. 8 is a rear view of the surveyor vehicle shown in FIG. 6, on a strongly inclined road.

FIGS. 7 and 8 show surveyor vehicle 1 on a road having a distinct ascent (FIG. 7) and a distinct decline (FIG. 8).

On front measuring arm 10, between road surface and video camera, a sleigh is provided parallel relative to the xy table on which a marker device is mounted. The measuring procedure is started in that on the sleigh the marker device is moved into the axis of the video camera and applies a measuring mark onto the road surface. The vehicle moves forward for the distance equal to that between the cross hairs of the two video cameras, and by means of the rear video camera traces the measuring mark earlier applied. During the tracing process in the x direction and in the y direction, the vertical sensors 13 and 14 adjust the respective vertical bars 11 and 12 into the vertical position so that the laser beam is emitted horizontally, i.e. at right angles relative to vertical bar 11.

After the arrival of laser beam sensor 16 in the beam axis, all measurements in perpendicular directions are performed in a similar way as described in the foregoing.

A computer calculates from the measurements the absolute height difference between the front and the rear vertical bar base point and stores the measuring results.

Subsequently, the surveyor vehicle moves forward for the same distance as described above and traces again, by means of rear video camera 5 the measuring mark applied, and so on.

Figure 9:
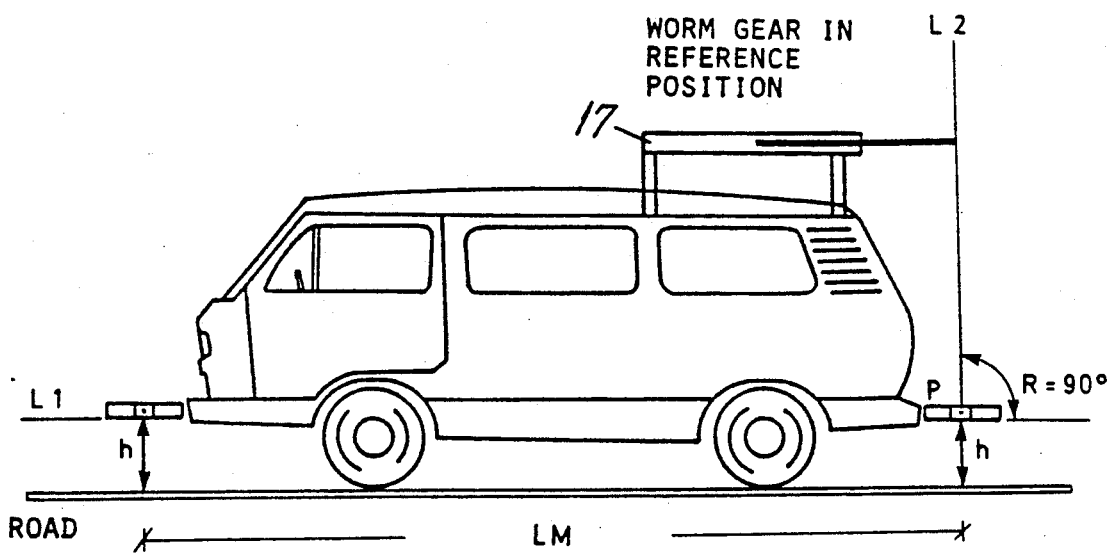
FIG. 9 is a lateral view of a surveyor vehicle according to a different embodiment of the invention, wherein one reference line each is in parallel to the road and a second reference line at right angles relative to said first one.
Figure 10:
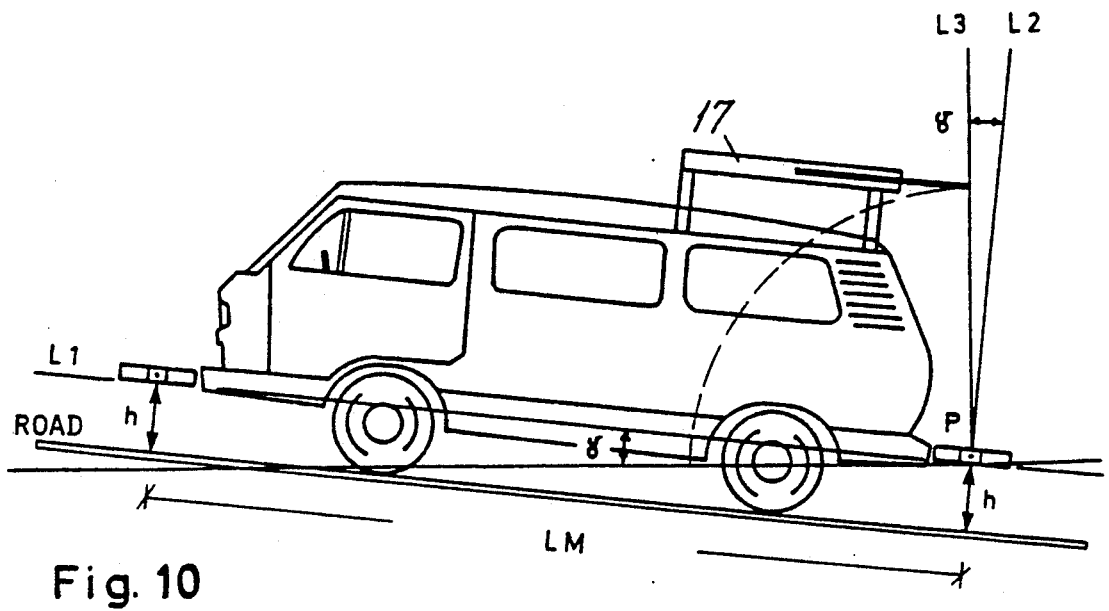
FIG. 10 is a lateral view of the surveyor vehicle of FIG. 9 on an inclined road wherein a second reference line is inclined at the angle of inclination of the road relative to a vertical bar adjustable by a worm gear.

Based on FIGS. 9 and 10, a further embodiment of the invention is described.

FIG. 9 shows the lateral view of a surveyor vehicle in which one reference line L1 is in parallel relative to the road while a second reference line L2 which is at right angles relative to the former defines a right angle quasi connected with the surveyor vehicle. On a road which has no incline, this right reference angle is adjusted. To this end, there is provided, for instance on the roof of the surveyor vehicle, a worm gear 17 the worm of which can be extracted (in the shown example to the rear) and the end of which is connected with a vertical bar. This vertical bar is further pivotally supported at a point P on the first reference line L1. By means of vertical sensors known per se, the worm gear 17 is so adjusted that the vertical bar together with the first reference line L1 forms a right angle.

If now this surveyor vehicle is on a road which is inclined about an angle γ relative to the horizontal line, the vertical bar is no longer perpendicular, but rather in the direction L2 of FIG. 10. Vertical sensors effect an adjustment of the worm gear 17 until the vertical bar is again in the perpendicular line, i.e. is directed in direction L3. The control data required for the adjustment of the worm gear 17, for instance rotations of the worm gear, angle of rotation of a servo motor, change of the length of the worm gear, etc., can be calibrated as angular degrees and stored away as respective data.

As can be taken from FIG. 10, the angle of incline γ of the road relative to the horizontal line is identical to the angle γ the reference line L2 forms as a leg of the right angle R with the perpendicularly arranged vertical bar extending in direction L3. In this way, the inclination of the road can directly be measured and stored in the form of control parameters for the worm gear.

Analogous devices operating in the y direction of the surveyor vehicle can be used in order to measure the inclinations of the road at right angles relative to the road axis.

An advantage of this embodiment consistis in that the control of the vertical bar via the worm gear can automatically be performed by means of the vertical sensors.

In practical surveying, either the operator can initiate the measurement by pressing a button when approaching a measuring mark, or the vertical sensors will continuously re-adjust the vertical bar via the worm gear while travelling. In this way, data of inclination angles can continuously be measured, picked up and stored.

Particularly when combining this embodiment with metallic measuring marks which are inductively traced and picked up, completely automatic measurement is possible.

We claim:

1. A method for determining measurements of an elongated road segment, comprising the steps of:
   applying detectable marks along the road surface in the direction of elongation of the road segment;
   scanning the locations of a pair of sequentially spaced marks by means of a pair of detectors supported on a surveyor vehicle;
   measurably adjusting the positions of the detectors on the vehicle to accurately position the detectors with respect to the pair of scanned marks;
   determining the straight line distance between the adjusted detectors, and
   repeating said scanning and adjusting steps for subsequent pairs of marks until the road segment is traversed.

2. The method of claim 1, wherein said marks are initially applied onto the road surface with an approximately equal spacing of a predetermined amount, and wherein said step of determining calculates the exact straight line distance between the marks.

3. The method of claim 1, wherein locations of said marks are accurately determined by adjustable positioning of the detectors.

4. The method of claim 1, wherein said surveyor vehicle continuously moves along the road, and wherein the position of a pair of sequential marks with respect to each other are recorded for each pair of marks, and subsequently the distance between the marks is determined from the recorded information.

5. The method of claim 1, wherein the surveyor vehicle includes an adjustable gauging system for measurably adjusting a length measurement, the pair of detectors being located at the respective ends of said gauging system, and wherein said step of measureably adjusting includes adjustment of the length of the gauging system.

6. The method of claim 1, and further comprising measuring the width of the road segment at each mark by utilizing an adjustable width gauge extending from the surveyor vehicle with a detector at the proximal end and a detector at the distal end of the width gauge, comprising the steps of adjustably positioning the proximal end detector over a mark, adjustably extending the distal end detector to detect a side position of the road, and determining the straight line width distance between the proximal and distal end detectors.

7. The method of claim 6, wherein the width distance determined is for one side of the road, and further comprising the steps of traversing the road in the opposite direction and repeating the steps of width distance determination for the other side of the road, and combining the two width determinations for the total width.

8. The method of claim 1, and further comprising measuring the height difference between two marks by utilizing vertical bars having their lower ends respectively coupled to each detector, and their upper ends coupled to means for maintaining a vertical orientation to the bars, and a horizontal light beam generated from one bar and its height position measured on the other bar, the method for measuring heights comprising the step of determining the height distance of the movement of the detected light beam from an initial horizontal position, as the vehicle moves to a final position at which the two marks are being measured by the detectors.

9. The method of claim 8, and further comprising the steps of determining the ascent of the road along the road segment by surveying the height difference between marks at the beginning and end of the road segment, determining the length distance between the beginning and end marks, and calculating the ascent therefrom.

10. The method of claim 1, and further comprising measuring the inclination of the road segment by determining the angular inclination of a reference line associated with the angular orientation of the vehicle on the road surface with respect to a vertical orientation.

11. The method of claim 6, and further comprising measuring the height difference along the width of the road segment by utilizing vertical bars having their lower ends respectively coupled to each of the detectors on the width gauge, and their upper ends coupled to means for maintaining a vertical orientation to the bars, and a horizontal light beam generated from one bar and its height position measured on the other bar, the method for measuring the height comprising the steps of determining the distance of movement of the detected light beam from an initial horizontal position to a final position at which time the width gauge detectors make their measurements.

12. An apparatus for determining the measurements of an elongated road segment, comprising:
a surveyor vehicle for traversing the road segment;
means for applying detectable marks along a surface of the road segment along the length of the road segment;
a gauging system on the vehicle comprising a pair of spaced apart detectors for scanning the respective locations of a pair of sequential marks, adjustment means coupled to said detectors for adjustment of each detector with respect to the vehicle to accurately position the detector with respect to its scanned mark, and measuring means for accurately determining the straight line distance between the detectors.

13. The apparatus of claim 12, wherein said applying means applies the marks at a predetermined approximate equal spacing along the road surface, and the measuring means measures the exact straight spacing between the marks.

14. The apparatus of claim 12, wherein said applying means is on said surveyor vehicle.

15. The apparatus of claim 12, wherein said applying means is on a vehicle other than said surveyor vehicle.

16. The apparatus of claim 12, and further comprising means for storing information with respect to the positioning of the detectors to detect each pair of sequential marks, and calculating means for calculating the length of the road segment from the stored information.

17. The apparatus of claim 12, wherein said adjustment means comprises a telescoping bar extending between said detectors whose length can be accurately measured.

18. The apparatus of claim 12, wherein said adjustment means comprises a support table, and movement means for movement of said table in each of a longitudinal and a transverse direction.

19. The apparatus of claim 12, and further comprising means for determining the height difference between two marks, comprising a pair of vertical bars, pivot means for respectively coupling one end of each bar to a respective detector, leveling means coupled to the other ends of the bars for maintaining the bars in a vertical orientation despite any angular inclinations of the vehicle, a light beam source on one of the bars for emitting a light beam at a right angle from the bar and directed toward the other bar, sensor means on the other bar for sensing the vertical level of the light beam, and means for deriving the difference in height between marks based on the vertical level sensed.

20. The apparatus of claim 19, and further comprising a height gauge means located on said vehicle for measuring the height from the road surface to the detectors.

21. The apparatus of claim 12, wherein said marks are visible marks, and wherein said detectors comprise video cameras and including indication means for accurate detection of a visible mark on said video camera.

22. The apparatus of claim 12, and further comprising means for determining the inclination of the road segment, comprising a reference bar located on said vehicle in a direction perpendicular to a base of the vehicle, adjustment means for orienting said bar into a vertical orientation, and means for measuring the angular arc required for such orientation.

* * * * *